United States Patent [19]

Rubanov et al.

[11] 4,420,218

[45] Dec. 13, 1983

[54] METHOD OF OBJECT IMAGING

[75] Inventors: Alexandr S. Rubanov; Leonid V. Tanin; Ljudmila V. Vasilieva; Anatoly N. Kalinin; Vyacheslav A. Bursky; Felix V. Vidmant, all of Minsk, U.S.S.R.

[73] Assignee: Institut Fiziki an Bssr, U.S.S.R.

[21] Appl. No.: 237,377

[22] Filed: Feb. 23, 1981

[30] Foreign Application Priority Data

Apr. 19, 1980 [SU] U.S.S.R. .............................. 2912365
May 26, 1980 [SU] U.S.S.R. .............................. 2922101

[51] Int. Cl.³ .............................................. G03H 1/22
[52] U.S. Cl. ................................... 350/3.85; 350/3.77
[58] Field of Search ..................... 350/3.6, 3.75, 3.77, 350/3.85, 3.86, 3.81, 319

[56] References Cited

U.S. PATENT DOCUMENTS 3,560,921  2/1971  Lopez ................................. 350/3.85
4,165,930  8/1979  Matsumoto et al. ............... 350/3.85

Primary Examiner—Bruce Y. Arnold
Assistant Examiner—William Propp
Attorney, Agent, or Firm—Lilling & Greenspan

[57] ABSTRACT

A method consisting in that the holographic image of an object is recorded on a substrate, a two-dimensional image of the same or any other object of interest is formed on a separate substrate, and the substrate with the holographic image is then so arranged with respect to that with the two-dimensional image that both images are oriented to produce the desired effect. The images are reconstructed through illumination by a light beam of varying intensity and spatial coherence.

42 Claims, 6 Drawing Figures

METHOD OF OBJECT IMAGING

The present invention relates to coherent optics and holography and, more particularly, to object imaging methods.

The invention can most advantageously be used in data storage systems, spatial separation of images, panorama design, copying of art objects, portrait holography, advertising, as well as in visual and teaching aids, exhibition and other stands, and souvenirs.

Known in the art is a method of object imaging whereby three-dimensional images of objects are recorded and reconstructed. The recording is by means of holography with an oblique reference beam. During holographic recording the light emitted by a laser is split into two beams, one of them being incident upon the object, while the other serves as a reference beam. On a recording medium (photographic material) an interference pattern (hologram) is formed by the reference wave and the wave scattered by the object. When the hologram is illuminated by the initial reference beam, a wavefront is formed identical with the initial wavefront scattered by the object (see E. N. Leith and J. Upatnieks, "Reconstructed Wavefronts and Communication Theory", J.Opt.Soc.Am, 52, No. 10, 1962).

A disadvantage of this method is that the reconstruction makes it absolutely necessary to use a laser source.

Also known is an imaging technique residing in that three-dimensional images are recorded and reconstructed by holography using opposing beams. In this case a three-dimensional diffraction pattern, or a reflective hologram, is recorded, which is characterized by high spectral sensitivity. Such a hologram can be reconstructed by means of light sources in a broad range of spectral compositions (incandescent lamps, sunlight, etc.). When reconstructed, the reflective hologram reproduces not only the structure of the recorded object wavefront but also the spectral composition of the light (see Yu. N. Denisyuk, "On Reconstructing Optical Properties of an Object in the Wavefield of Scattered Radiation", Doklady AN SSSR, 144, 1275, 1962, in Russian).

In yet another method of color holographic imaging several primary reflective holograms of an object are recorded, each at a different wavelength. Reconstruction by a light beam from a source with a broad spectral composition range produces a color image of the object (see P. Hariharan, W. H. Steel, and Z. S. Hegedus, "Multicolor White-Light Reconstruction of Holographic Image", Optic Letters, 1, No. 1, 1977, pp. 8-9).

The drawbacks of these methods are that, in the absence of a reconstructing laser or point source with a broad spectral composition range, the image cannot be reconstructed and the holograms carry no visual information.

It is an object of the present invention to provide a method of object imaging that will ensure continuous inflow of visual information.

Another object of the invention is to permit formation of combined holographic and incoherent two-dimensional images.

Still another object of the invention is to provide the possibility of controlling the volume of the information obtained from the combined images.

Yet another object of the invention is to raise the criterion of visual efficiency.

A further object of the invention is to enable control of the process of reconstruction and selection of the recorded information.

These objects are attained by that in a method of object imaging, whereby a light beam is used to reconstruct the holographic image of an object, recorded in advance on at least one substrate, according to the invention, a two-dimensional image of the same or any other object of interest is formed on a separate substrate and the substrate with the holographic image is so arranged with respect to the two-dimensional image that both images are oriented to produce the desired effect, the images being reconstructed through illumination of the substrates with the holographic and two-dimensional images by a light beam of varying intensity and spatial coherence.

This permits a visible image of the object to be continuously produced.

The two-dimensional image of the object can be formed on a separate substrate from the reconstructed holographic image thereof.

The visual impact can be enhanced by forming a color two-dimensional image.

The substrates with the holographic and two-dimensional images can be mutually oriented so that the contours of the images coincide.

This enhances the perception of the formed image.

The substrates with the holographic and two-dimensional images should preferably be illuminated by a light beam the intensity and spatial coherence whereof varies within limits required to produce either a two-dimensional or a holographic image, whereby the amount of the incoming information can be controlled and selected.

To extend the possibilities of the method, the substrate with the holographic image comprises several holograms of the same or at least one other object, recorded at the same or different wavelengths, and the image formed by both substrates is reconstructed through illumination of the substrates by a light beam with a varying spectral composition.

The substrate with the holographic image may comprise several holograms of at least one object with a given orientation, recorded with the polarization vector direction varying according to the object orientation, and the image is reconstructed through illumination of the substrates by a light beam with a varying polarization vector direction.

This is a factor substantially raising the criterion of visual efficiency.

The two-dimensional image should preferably be formed on a substrate the material whereof permits reproduction of the two-dimensional image through reflection or scattering of the incident light.

The substrate should preferably be made two-layered, for example, one layer being reflective and based on silver, aluminum, titanium, chromium, or their compounds, while the other layer is photosensitive and based on silver-containing emulsions, silver-free emulsions, negative or positive photoresists.

Besides, the material of the substrate with the two-dimensional image should permit reproduction of the two-dimensional image under the effect of external electric or thermal factors, or through self-emission when the substrate is based on electroluminescent or semiconductor displays or represents a variable information display.

The present invention provides for object imaging that enables continuous inflow of visual information in controlled amounts.

Other objects and advantages of the invention will become more apparent from the following description of preferred embodiments thereof, taken in conjunction with the accompanying drawings, wherein.

The object imaging method disclosed herein comprises the following steps described in sequence.

Here and in what follows the term "object" applies to numerals or letters, machine components, drawings, photographs, works of art or their images, or any other material object occurring in nature or produced by man.

Figure 1:
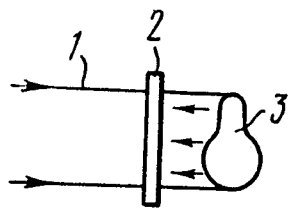
FIG. 1 shows schematically how a holographic image is produced.

The holographic image of an object is recorded on a substrate by any one of the widely known techniques. For example, the recording is made in opposing beams. A laser beam 1 (FIG. 1) falls on a photographic plate 2, passes through it and is scattered by an object 3 in the opposite direction. In the emulsion layer of the photographic plate 2 the forward and scattered beams interfere, whereby a hologram is produced.

In addition to the hologram, a two-dimensional image of the same or one or several other objects is formed on a separate substrate. To this end any appropriate method may be used, for example, the widely used photolithographic technique.

The two-dimensional image is produced photolithographically either directly from the object or from its reconstructed holographic image with subsequent copying by projection or contact printing on various information carriers (substrates).

In the case where photographic emulsions and photoresists are used, the substrate is made two-layered to enhance the reflecting power of the image, and superimposed on the photosensitive layer is a reflective layer based on silver, aluminum titanium, chromium, or their compounds, with subsequent photochemical treatment after exposure using the well known photolithographic technique. In this case the two-dimensional image is reproduced through reflection of the incident light from the substrate.

Depending on the distinctive features of the object (size of important image details, color) the photosensitive layer is based on silver-containing emulsions, silver-free emulsions, negative or positive photoresists.

As the silver-containing emulsions any one of the commercially available photographic emulsions can be used, while used as the silver-free emulsions can be chrome-tanned gelatine or shellac.

The substrate on which the two-dimensional image is formed should preferably be made of a material permitting reproduction of the two-dimensional image through scattering of the incident light, such as a liquid-crystal display.

Such displays are made as follows:

Two glass plates are coated with a transparent conductive layer of tin dioxide $SnO_2$. Then, part of the conductive layer is removed in accordance with the information to be displayed. A nematic liquid-crystal layer 10 to 20 microns thick is placed between the plates. The plates are bonded in such a manner that the conductive layers are inside. 10 to 20 volts are applied to the transparent conductive layers (electrodes). The energized portions of the liquid-crystal layer intensively scatter light (dynamic scattering effect). Other portions of the liquid-crystal layer, corresponding to the areas from which the conductive layer has been removed, remain transparent. Thus, the desired image is produced. As the liquid crystal use can be made of methoxybenzylidenebutylmanimine which has a nematic structure at room temperature.

The liquid-crystal variable information display is made as follows.

Transparent electrodes of tin dioxide $SnO_2$ are deposited on one side of glass plates. A nematic liquid-crystal layer 10 to 20 microns thick is placed between the plates which are bonded so that the electrodes are in contact with the liquid crystal. Methoxybenzylidenebutylmanimine which has a nematic structure at room temperature can be used as the liquid crystal. Application of 10 to 20 volts to the electrodes displays one of the images depending on the activation of respective electrodes as a result of dynamic scattering in the nematic liquid crystal under the effect of the applied voltage. Thus, variable information appears on such a display.

The use of liquid crystals to form combined images permits their visual perception to be enhanced owing to the dynamic characteristics of the recording medium, which also allows composition of texts in illuminated letter advertising.

Displays for forming two-dimensional images can also be built around semiconductor photoelectric light sources based on gallium phosphide, silicon carbide, or gallium arsenide. To display alphanumeric or other information an array of discrete elements based on light-emitting diodes is assembled, ensuring light emission within a broad spectral range. For switching purposes large-scale integration circuits are used in the displays, as well as arrays of semiconductor cells.

Also used are displays changing color when heated and capable of operating at high external lighting levels. An example of such a display is a system including a dielectric plate with a thermochromic layer of a phase-transforming interference reflector based on vanadium oxides being deposited on one side and a thin-film heater on the other.

As a result of heating the necessary information is displayed. The possibility to apply thermochromic layers over large areas enables large displays to be made.

In some cases the use of thermochromic layers makes it possible to create various color combinations to improve the visual impact of the produced images, which is of interest to designers of visual and teaching aids, exhibition and other stands, panoramas, and the like.

The two-dimensional image is also formed on a substrate made of a material permitting reproduction of the image through self-emission of electroluminescent materials.

An electroluminescent display is based on cells in the form of flat elements with luminophor as the dielectric. The function of the capacitor is performed by the conductive layer of tin dioxide or cadmium oxide deposited on a glass plate.

When energized the luminophor emits light whose intensity increases with the applied voltage.

To visualize two-dimensional images of objects use is made of electroluminescent digital and character displays as well as screen-type devices with matrix addressing. Such devices permit predetermined constant or variable information to be displayed. Electroluminescent displays in combined image formation systems are best suited for advertising purposes.

A two-dimensional image permits storage of information about an object under unfavorable viewing conditions and enables selective separation from the entire amount of information contained in an image of a desired portion or successive separation of several such portions.

The two-dimensional image is formed from a reconstructed holographic image, including an image recorded in advance by any known method. The two-dimensional image can also be formed directly from the holographic image of an object.

Visualization of diverse information (textual, character, graphic) can be achieved by using plasma display panels containing a plurality of separate gas-discharge cells emitting light under the effect of a voltage applied in the visible region (e.g. neon, in the red region). Use can also be made of gas-filled cells coated with luminophor and excited by the ultraviolet emission of gas-discharge cells, for example, based on xenon. The predetermined images, permanent or variable, are formed through emission from the gas-filled cells in which an electric discharge is initiated. Plasma-type displays are arranged in any convenient manner, including in the form of arrays.

The substrates with the holographic and two-dimensional images are mutually arranged so as to achieve the desired effect: for example, to obtain continuous and controlled information about an object, to extend the visibility range of the image, to form combined holographic and incoherent images, to enhance depth perception, to create various compositions and sceneries (including color and mobile ones), and to provide for other similar effects.

The substrates are so arranged that the image contours coincide, thereby creating an illusion that a two-dimensional image acquires a third dimension.

To enhance the effect of spatial separation of object images the substrates are arranged so that the images are mismatched.

Thus, the substrate with the holographic image is superimposed on that with the two-dimensional image in the path of the illuminating beam. For example, the substrates can form a rigid joint achieved by bonding or mechanical attachment or be spaced a certain distance apart.

In cases where the substrate with the two-dimensional image is based on liquid crystals or includes a thermochromic layer of electroluminescent or plasma cells, it is always placed behind the substrate with the holographic image.

The substrates with the holographic and two-dimensional images can be mutually oriented so as to form a closed polygon; for example, four or more alternating substrates can be so arranged at an angle to one another as to form the so-called "open book" pattern (the opening angle ranges from 0° to 180° C.), or in a mosaic fashion, in the form of an array with any alternation pattern. Such an orientation of the substrates orients the images in a particular manner in accordance with the desired effect.

For image reconstruction both substrates are simultaneously illuminated by a light beam of varying intensity and spatial coherence. The intensity and spatial coherence of the reconstructing light beam vary within limits ensuring visualization of the holographic or two-dimensional image. The intensity is selected depending on the technique or material involved in the recording of the two-dimensional and holographic images. The intensity variation range is rather broad. The spatial coherence variation range of the reconstructing beam determines the contrast of the holographic image in the case where composite images are produced to enhance the visual impact, or when it is desired to create an illusion of an object of intricate configuration not existing in reality but being of an engineering or artistic value, or objects conventionally divided by a plane in which case two images are produced, one representing the object's portion in front of the dividing plane and the other showing the object's portion behind the plane, one hologram containing the first image and another containing an orthoscopic image of the remaining part of the same object or other objects completing the desired composition. For example, to obtain a combined image the object is holographed twice: the first hologram records only one part of the object, in front of the dividing plane, and the second hologram represents a normal image of the remaining part of the object.

Figure 2:
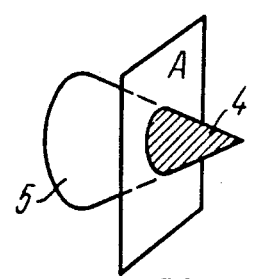
FIG. 2 shows an object conventionally divided by a plane.
Figure 3:
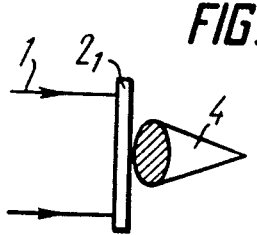
FIG. 3 shows the recording of the image of the object's part in front of the dividing plane.
Figure 4:
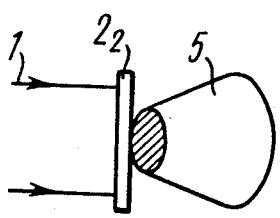
FIG. 4 shows the recording of the image of the object's part behind the dividing plane.
Figure 5:
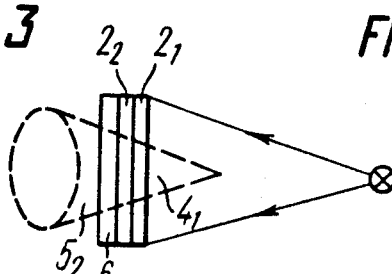
FIG. 5 shows the reconstruction of the recorded image.

Consider, for example, the recording of a holographic image of a cone divided by a plane A into two parts 4 and 5 (FIG. 2). Holographically recorded on a plate $2_1$ is the inverse top part 4 of the cone (FIG. 3), and an orthoscopic image of the cone in front of the dividing plane is obtained. The second hologram on a plate $2_2$ represents the remaining part 5 of the cone and is recorded in a usual manner (FIG. 4). Then, the first hologram is superimposed on the second one so that the image $4_1$ of the base of the top part 4 of the cone is matched with the image $5_1$ of the top face of the bottom part $5_2$ of the cone (FIG. 5). A plate 6 carries a two-dimensional image of the same object. The obtained holographic and two-dimensional images are matched.

In this case, the visual impact of the holographic image is enhanced and it becomes possible to create original imaginary sceneries and objects expressing the artistic concepts of the authors by producing composite images from several holograms.

Thus, by combining images one can produce holograms of objects of intricate configuration and control the depth of scene as desired.

To extend the possibilities of the object imaging method holograms are recorded at different wavelengths and the images recorded on substrates are reconstructed by means of a light source with a variable spectral composition, whereby high color fidelity is attained. For example, holograms are recorded in opposing beams or with an oblique reference beam. To record holograms a tunable laser is used, for example, an organic dye solution laser or lasers of other types. Rotation of the diffraction grating in the cavity of the dye laser or changing of the dye ensures continuous tuning of the lasing spectrum from 300 to 1,200 nm. To narrow the lasing spectrum a Fabry-Perot interferometer is introduced into the laser cavity. The width of the lasing spectrum is selected depending on the depth of the holographed scene ($1.10^{-3}$-3 m).

Used as the recording medium is a substrate of chrome-tanned gelatine or shellac with a high-resolution silver halide emulsion sensitized to a particular wavelength (red, green, blue). To produce a composite image the same or different objects in the case of combined sceneries or compositions are holographically recorded several times on separate substrates, each time at a different laser wavelength. In particular, the first hologram represents a two-color image of an object, recorded at a wavelength of 6,400 nm (red), while the second hologram represents an image of the same object, recorded at 550 nm (green), whereafter both holograms are matched and the reconstructed images are mutually oriented.

To control image reconstruction sources are used with spectral characteristics adjustable with the aid of, for example, interchangeable light filters and the recorded images are reconstructed successively at different wavelengths as a result of high spectral selectivity of the three-dimensional hologram. At a high rate of variation in the spectral composition of the light beam the color fidelity is similar to that attained during reconstruction of primary holograms each recorded at a different wavelength using a light source with widely varying spectral composition.

A similar imaging control procedure is carried out by illuminating in the same manner a color hologram recorded on a single emulsion at three wavelengths: red, green, and blue.

In addition, it becomes possible to make a combined recording of images in a broad spectral range, from the infrared to ultraviolet regions, with subsequent simultaneous reconstruction.

Figure 6:
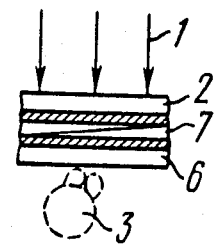
FIG. 6 shows the recording of an image using a light beam with a varying polarization vector direction.

A polaroid 7 (FIG. 6) is placed in front of the object's image recorded holographically on the plate 2, and the formed image is reconstructed by means of a light source with a variable polarization vector direction. The substrate in this case may be any photosensitive material: photographic emulsion, chrome-tanned gelatine, shellac, reversible media, liquid crystals, photoresists, and others.

Used for reconstruction is a light source of a widely varying spectral composition with a variable polarization vector direction. When the polarization vector direction changes, the appearance of the image recorded on the first hologram is accompanied by that reconstructed from the other hologram, which reaches a maximum intensity at an optimal transmission of the polaroid. When holograms are recorded at different wavelengths, the intensity of the images reconstructed from the holograms which are behind the polaroid is independent of the diffraction efficiency of the first hologram. When all holograms are produced at the same wavelength, the intensity of the image reconstructed from the holograms placed behind the polaroid will decrease inversely with the diffraction efficiency of the first hologram. Thus, it becomes possible to control the reconstruction of images by varying the polarization of the source light.

In the case of photosensitive media with light-induced anisotrophy (Weigert effect), when a moving object is holographed in different polarization vector directions, by changing the direction of the polarization vector of the readout beam one can reconstruct various images of holographed objects.

The invention will be better understood from the following examples of its practical embodiments.

EXAMPLE 1

A He-Ne laser is used for holographic imaging. By means of a microlens and a diaphragm the expanded and filtered laser beam is directed on an object to be holographed. The holographic plates are positioned before the object at a right angle or obliquely to the incident beam, whereby the recording is made in opposing beams. The He-Ne laser beam incident on the plate interferes with the light scattered by the object in the plane of the photographic emulsion which thus records the interference field carrying information on a three-dimensional image of the object. The exposure time is selected depending on the lasing power, sensitivity of the emulsion, and reflective characteristics of the object. The development takes 12 minutes and is performed at a temperature of $20 \pm 0.5°$ C.

The two-dimensional image is formed directly from the object using a known photographic technique. Then, both substrates with the three- and two-dimensional images are matched so that the two-dimensional image is superimposed on the hologram. The orientation of the objects is done at the holographic recording stage, whereby it corresponds to the desired composition of the image during reconstruction.

At the reconstruction stage, a point light source or sunlight is used to form a holographic image of the object, whose contrast is much better than that of the photographic image. As the intensity of the reconstructing light changes, that of the holographic image and the ratio of intensities of the holographic and photographic images vary, too. In the case of usual illumination by scattered light only the two-dimensional photographic image can be seen.

EXAMPLE 2

To record a holographic image consisting of three holograms of different objects two lasers (Ar and He-Ne) are used operating at three wavelengths (5145, 4888 and 6328 Å). The substrate is made of materials sensitive to these wavelengths. The objects form a certain composition. The exposure time during holographic recording is selected depending on the lasing power, sensitivity of the photographic material, and the reflective characteristics of the objects.

The resulting three holograms are matched.

The two-dimensional image is formed as in Example 1.

At the reconstruction stage, the substrate with the holographic image is matched with the photographic image and they are illuminated by a light source of a varying spectral composition. As a result, all three holographic images are reconstructed successively or simultaneously, each being viewed in combination with the two-dimensional image. In the absence of a light source with sufficient spatial coherence only the two-dimensional image is discernible.

EXAMPLE 3

The holographic imaging procedure is the same as in Example 1 or 2.

The substrate for the two-dimensional image is a glass plate with at least one polished surface. A chromium layer is deposited by vacuum evaporation on this plate. A known technique, such as pouring in a centrifuge, is used to apply a positive photoresist on the chromium layer. The photoresist film is dried at a temperature of $90 \pm 10°$ C. for 30 minutes, then exposed through a mask with alternating areas transparent and opaque to ultraviolet light.

The photoresist is developed depending on its composition in various agents, for example, in a 0.3% aqueous solution of KOH, and the photoresist portions exposed to light are dissolved. To improve the strength of the photoresist film it is hardened in a thermostat for 30 minutes at 30° C.

The resulting photoresist mask is used to form the necessary image by etching chromium in hydrochloric acid, then the photoresist is washed off with acetone, and the substrate is rinsed in a water stream for several minutes at 60 to 70° C.

EXAMPLE 4

The holographic imaging procedure is the same as in Example 1 and 2.

The two-dimensional image is formed on a separate substrate in the same manner as in Example 3 with the difference that a negative photoresist is used instead of a positive one.

The photoresist is exposed through a mask with alternating areas transparent and opaque to ultraviolet light. The development is carried out in an appropriate agent, and the unexposed portions are dissolved.

After the development the photoresist film is hardened for additional strength. The metal is etched through the resulting photoresist mask to finally produce the desired image, whereafter the photoresist is removed.

EXAMPLE 5

The holographic imaging procedure is the same as in Example 1 or 2.

The two-dimensional image is formed as in Example 5 with the difference that aluminum is sputtered on the glass plate.

EXAMPLE 6

The holographic imaging procedure is the same as in Example 1 or 2. The two-dimensional image is formed as in Example 3 with the difference that a photoresist mask is made on the glass plate in advance, then a silver layer is deposited on the substrate by vacuum evaporation, which remains only on the unmasked portions of the substrate after removal of the photoresist.

EXAMPLE 7

The holographic imaging procedure is the same as in Example 1 or 2. The two-dimensional image is formed as in Example 3 with the difference that a transparent red orange film of ferric oxide is deposited on the substrate by resistive evaporation. Then, a red orange two-dimensional image is produced as described in Example 3.

EXAMPLE 8

The holographic imaging procedure is the same as in Example 1 or 2.

The two-dimensional image of objects is formed as in Example 3 with the difference that a photoresist mask is formed in advance on a glass substrate, followed by deposition of a titanium layer by vacuum evaporation, which remains only on the unmasked portions of the substrate after removal of the photoresist.

EXAMPLE 9

The holographic imaging procedure is the same as in Example 1 or 2.

Before the two-dimensional image is formed a photoresist mask is made on a glass substrate, on which titanium and silica are deposited by vacuum evaporation in various volume ratios.

The photoresist with the deposited film is washed off with acetone and a dark coat (titanium+silica) remains on the areas from which the photoresist was removed during development. The various titanium to silica ratios permit varying the degree of coat blackness.

EXAMPLE 10.

The holographic imaging procedure is the same as in Example 1 or 2.

Used as the substrate for the two-dimensional image is a glass screen on which, on the reverse side with respect to the hologram, textual and graphic information is alternately projected, logically matched with the three-dimensional holographic image.

EXAMPLE 11

The holographic imaging procedure is the same as in Example 1 or 2.

Used as the substrate for the two-dimensional image is a photographic film carrying textual or graphic information logically matched with the three-dimensional holographic image. The information is changed by moving the photographic film.

EXAMPLE 12

The holographic imaging procedure is the same as in Example 1 or 2.

The two-dimensional image is formed on color photographic paper and represents a color photograph of the object, made so as to enable matching of the holographic and two-dimensional image contours. The photograph is made from color negative films. The color prints are processed in standard solutions.

At the reconstruction stage, the hologram and color photograph images are mutually oriented and a source of white light of variable intensity and spatial coherence is used. The intensity and spatial coherence of the white light being sufficient, a holographic image is produced having a contrast better than that of the photograph.

Variations in the intensity and spatial coherence of the reconstructing light changes the intensity of the holographic image and the intensity ratio of the holographic and photographic images. Usual illumination with scattered light visualizes only the two-dimensional color photograph.

EXAMPLE 13

To record a holographic image consisting of three holograms of a moving object two lasers (Ar and He-Ne) are used operating at three wavelengths (5145, 4880 and 6328 Å). The substrate carries two emulsions sensitive to these wavelengths. To produce the next hologram the object is turned through about 30°. The resulting holograms are superimposed on each other and matched with the substrate carrying a two-dimensional image of the same object produced by a conventional photolithographic technique, the object being in an intermediate position.

At the reconstruction stage, use is made of a light source with a varying spectral composition, which reconstructs successively all three holograms, thereby creating an illusion of a moving object. Under conditions not suitable for holographic reconstruction only the two-dimensional photolithographic image can be seen.

EXAMPLE 14

The holographic imaging procedure is the same as in Example 1 or 2.

The two-dimensional image is formed photolithographically from a negative produced by projecting a reconstructed hologram on a photographic film. The two-dimensional image provides the matching color for the desired composition.

What is claimed is:

1. A method of object imaging, comprising the following steps: recording of a holographic image of an object on a substrate; formation of a two-dimensional image of the same object on a separate substrate; mutual arrangement of said substrate having the holographic image thereon and said substrate having the two-dimensional image thereon for orientation of these images; and reconstruction of said images through illumination of said substrates by a light beam of varying intensity and of varying spatial coherence.

2. A method as claimed in claim 1, wherein said two-dimensional image is formed on a separate substrate by directly creating an image of the object.

3. A method as claimed in claim 2, wherein said two-dimensional image is formed in color.

4. A method as claimed in claim 1, wherein said two-dimensional image is formed in color.

5. A method as claimed in claim 1, wherein said two-dimensional image is formed on a separate substrate from said reconstructed holographic image.

6. A method as claimed in claim 5, wherein said two-dimensional image is formed on a separate substrate from said reconstructed holographic image.

7. A method as claimed in claim 5, wherein said substrate having the holographic image thereon and said substrate having the two-dimensional image thereon are simultaneously illuminated by a light beam the intensity and spatial coherence whereof vary within limits required to produce either said two-dimensional image or said holographic image.

8. A method as claimed in claim 1, wherein said substrate having the holographic image thereon and said substrate having the two-dimensional image thereon are mutually oriented so that the contour of said holographic image and the contour of said two-dimensional image coincide.

9. A method as claimed in claim 1, wherein said substrate having the holographic image thereon and said substrate having said two-dimensional image thereon are simultaneously illuminated by a light beam, the intensity and spatial coherence of which vary within limits required to produce either said two-dimensional image or said holographic image.

10. A method as claimed in claim 9, wherein said substrate having the holographic image thereon and said substrate having the two-dimensional image thereon are mutually oriented so that the contour of said holographic image and the contour of said two-dimensional image coincide.

11. A method of object imaging, comprising the following steps: recording of a holographic image of an object on a substrate; formation of a two-dimensional image of any other object of interest on a separate substrate; mutual arrangement of said substrate having the holographic image thereon and said substrate having the two-dimensional image thereon for orientation of these images; and reconstruction of said images through illumination of said substrates by a light beam of varying intensity and of varying spatial coherence.

12. A method as claimed in claim 11, wherein said two-dimensional image is formed on a separate substrate by directly creating an image of the object.

13. A method as claimed in claim 11, wherein said two-dimensional image is formed in color.

14. A method as claimed in claim 11, wherein said substrate having the holographic image thereon and said substrate having the two-dimensional image thereon are simultaneously illuminated by a light beam, the intensity and spatial coherence of which vary within limits required to produce either said two-dimensional image or said holographic image.

15. A method of object imaging, wherein at least one holographic image of at least one object is recorded on a substrate, said holographic image or images being recorded at the same wavelength;
a two-dimensional image of the same object or objects is formed on a separate substrate;
said substrate having the holographic image or images thereon and said substrate having the two-dimensional image thereon are mutually arranged so that the images are oriented;
and, to reconstruct said images, said substrate having the holographic image or images thereon and said substrate having the two-dimensional image thereon are illuminated by a light beam of varying intensity, of varying spatial coherence, and of varying spectral composition.

16. A method as claimed in claim 15, wherein said two-dimensional image is formed on a separate substrate by directly creating an image of the object.

17. A method as claimed in claim 16, wherein said substrate having the holographic image or images thereon and said substrate having the two-dimensional image thereon are mutually oriented so that the contour of one of said holographic image or images and the contour of said two-dimensional image coincide.

18. A method as claimed in claim 15, wherein said substrate having the holographic image or images thereon and said substrate having the two-dimensional image thereon are mutually oriented so that the contour of one of said holographic image or images and the contour of said two-dimensional image coincide.

19. A method as claimed in claim 15, wherein said substrate having the holographic image or images thereon and said substrate having the two-dimensional image thereon are simultaneously illuminated by a light beam the intensity and spatial coherence whereof vary within limits required to produce either said two-dimensional image or said holographic image or images.

20. A method as claimed in claim 19, wherein said substrate having the holographic image or images thereon and said substrate having the two-dimensional image thereon are mutually oriented so that the contour of one of said holographic image or images and the contour of said two-dimensional image coincide.

21. A method of object imaging, wherein holographic images of at least one object is recorded on a substrate;
said holographic images are recorded at different wavelengths, each wavelength corresponding to one said holographic image;
a two-dimensional image of the same objects is formed on a separate substrate;
said substrate having the holographic images thereon and said substrate having the two-dimensional image thereon are mutually arranged so that the images are oriented;

and, to reconstruct said images, said substrate having the holographic images thereon and said substrate having the two-dimensional image thereon are illuminated by a light beam of varying intensity, of varying spatial coherence, and of varying spectral composition.

22. A method as claimed in claim 21, wherein said two-dimensional image is formed on a separate substrate by directly creating an image of the object.

23. A method as claimed in claim 21, wherein said substrate having the holographic images thereon and said substrate having the two-dimensional image thereon are mutually oriented so that the contour of one of said holographic images and the contour of said two-dimensional image coincide.

24. A method as claimed in claim 21, wherein said substrate having the holographic images thereon and said substrate having the two-dimensional image thereon are simultaneously illuminated by a light beam the intensity and spatial coherence whereof vary within limits required to produce either said two-dimensional image or said holographic images.

25. A method as claimed in claim 21, wherein said two-dimensional image is formed in color.

26. A method as claimed in claim 21, wherein said two-dimensional image is formed on a separate substrate from said reconstructed holographic image.

27. A method of object imaging, wherein at least one holographic image of at least one object with a given orientation is recorded on a substrate;
    said holographic image or images are recorded with the polarization vector varying according to the object orientation;
    a two-dimensional image of the same objects is formed on a separate substrate;
    said substrate having the holographic image or images thereon and said substrate having the two-dimensional image thereon are mutually arranged so that the images are oriented;
    and, to reconstruct said images, said substrate having the holographic image or images thereon and said substrate having the two-dimensional image thereon are illuminated by a light beam of varying intensity, of varying spatial coherence, and of varying polarization vector direction.

28. A method as claimed in claim 27, wherein said two-dimensional image is formed on a separate substrate by directly creating an image of the object.

29. A method as claimed in claim 28, wherein said substrate having the holographic image of images thereon and said substrate having the two-dimensional image thereon are mutually oriented so that the contour of one of said holographic image or images and the contour of said two-dimensional image coincide.

30. A method as claimed in claim 27, wherein said two-dimensional image is formed on a separate substrate from said reconstructed holographic image.

31. A method as claimed in claim 27, wherein said substrate having the holographic image of images thereon and said substrate having the two-dimensional image thereon are mutually oriented so that the contour of one of said holographic image or images and the contour of said two-dimensional image coincide.

32. A method as claimed in claim 27, wherein said substrate having the holographic image or images thereon and said substrate having the two-dimensional image thereon are simultaneously illuminated by a light beam the intensity and spatial coherence whereof vary within limits required to produce either said two-dimensional image or one of said holographic image or images.

33. A method as claimed in claim 32, wherein said two-dimensional image is formed on a separate substrate from said reconstructed holographic image.

34. A method of object imaging, wherein at least one holographic image of at least one object is recorded on a substrate;
    a two-dimensional image of the same objects is formed on a separate substrate;
    the material for said substrate on which said two-dimensional image is formed is selected such as to permit reproduction of said two-dimensional image through reflection of the incident light;
    said substrate having the holographic image of images thereon and said substrate having the two-dimensional image thereon are mutually arranged so that the images are oriented;
    and, to reconstruct said images, said substrate having the holographic image or images thereon and said substrate having the two-dimensional image thereon are illuminated by a light beam of varying intensity and spatial coherence.

35. A method as claimed in claim 34 wherein said two-dimensional image is formed on said substrate which is made of a first layer and a second layer, said first layer being reflective and made of a material selected from the group consisting of silver, aluminum, titanium, chromium, and compounds of each of these metals, said second layer being photosensitive and made of a material selected from the group consisting of silver-containing photosensitive emulsions, silver-free emulsions, negative photoresists, and positive photoresists.

36. A method as claimed in claim 34, wherein said substrate for said two-dimensional image is a variable information display.

37. A method of object imaging, wherein at least one holographic image of at least one object is recorded on a substrate;
    a two-dimensional image of the same objects is formed on a separate substrate;
    the material for said substrate on which said two-dimensional image is formed is such as to permit reproduction of said two-dimensional image through self-emission and selected from the group consisting of electroluminescent and semiconductor materials;
    said substrate having the holographic image or images thereon and said substrate having the two-dimensional image thereon are mutually arranged so that the images are oriented;
    and, to reconstruct said images, said substrate having the holographic image thereon and said substrate having the two-dimensional image thereon are illuminated by a light beam of varying intensity and of varying spatial coherence.

38. A method as claimed in claim 37, wherein said substrate for said two-dimensional image is a variable information display.

39. A method of object imaging, wherein at least one holographic image of at least one object is recorded on a substrate;
    a two-dimensional image of the same objects is formed on a separate substrate;

the material for said substrate on which said two-dimensional image is formed is selected such as to permit reproduction of said two-dimensional image under the effect of an externally applied voltage;

said substrate having the holographic image or images thereon and said substrate having the two-dimensional image thereon are mutually arranged so that the images are oriented;

and, to reconstruct said images, said substrate having the holographic image or images thereon and said substrate having the two-dimensional image thereon are illuminated by a light beam of varying intensity and spatial coherence.

40. A method as claimed in claim 34, wherein said substrate for said two-dimensional image is a variable information display.

41. A method of object imaging wherein at least one holographic image of at least one object is recorded on a substrate;

a two-dimensional image of the same objects is formed on a separate substrate;

the material for said substrate on which said two-dimensional image is formed is selected such as to permit reproduction of said two-dimensional image under the effect of an external thermal factor;

said substrate having the holographic image or images thereon and said substrate having the two-dimensional image therein are mutually arranged so that the images are oriented;

and, to reconstruct said images, said substrate having the holographic image or images thereon and said substrate having the two-dimensional image thereon are illuminated by a light beam of varying intensity and of varying spatial coherence.

42. A method as claimed in claim 41, wherein said substrate for said two-dimensional image is a variable information display.

* * * * *